United States Patent [19]

Silva et al.

[11] 4,034,151

[45] July 5, 1977

[54] SPLICE CONNECTOR WITH INTERNAL HEAT TRANSFER JACKET

[75] Inventors: Frank A. Silva, Basking Ridge; Robert W. Mayer, Hackettstown, both of N.J.

[73] Assignee: Amerace Corporation, New York, N.Y.

[22] Filed: May 14, 1975

[21] Appl. No.: 577,558

[52] U.S. Cl. .......................... 174/73 R; 339/59 R; 339/112 R
[51] Int. Cl.² ....................................... H02G 15/08
[58] Field of Search ............. 174/73 R, 73 SC; 339/59 R, 60 R, 60 C, 61 R, 112 R, 143 R, 143 C

[56] References Cited

UNITED STATES PATENTS

| | | | |
|---|---|---|---|
| 3,344,391 | 9/1967 | Ruete | 174/73 R UX |
| 3,499,100 | 3/1970 | O'Mara | 174/73 R |
| 3,656,084 | 4/1972 | Malia | 174/73 R UX |
| 3,691,291 | 9/1972 | Taj | 174/73 R |
| 3,795,758 | 3/1974 | O'Mara | 174/73 R |

*Primary Examiner*—Laramie E. Askin
*Attorney, Agent, or Firm*—S. Michael Bender; Arthur Jacob

[57] ABSTRACT

A heat transfer jacket is placed over the terminal portions of the conductors of a pair of high voltage cables which are connected in a splice connection wherein a housing surrounds the connected conductor portions, the heat transfer jacket extending longitudinally between the confronting ends of a pair of adaptor sleeves placed upon the insulation of the cables to engage and locate the adaptor sleeves relative to one another, and laterally between the conductors and the housing to provide a path of relatively high thermal conductivity between the connected conductor portions and the housing.

20 Claims, 4 Drawing Figures

SPLICE CONNECTOR WITH INTERNAL HEAT TRANSFER JACKET

This invention resulted from work done under Contract No. E(49-18)-1559 with the Energy Research and Development Administration.

The present invention relates generally to electrical connections and pertains, more specifically, to an electrical connector for providing an improved splice connection, in the field, between high voltage electrical cables in power distribution systems, the improvement enabling operation of the splice connection at higher voltages than heretofore attainable in earlier splice connections of the same general type. In recent years, heavy emphasis has been placed upon the development of underground electrical power distribution systems, especially in light industrial, commercial and residential area. Various power distrubution components, such as electrical cables, transformers and electrical connectors have been evolved for use in such systems.

Among these components, electrical connectors have been developed which are assembled easily in the field at the terminal ends of electrical cables so as to facilitate the construction and installation of underground power distribution systems. For the most part, these connections, have been of the type which are selectively disconnectable for the purpose of periodic maintenance of the system. However, not all connections in power distribution systems need be of the disconnectable type and, more recently, splice connectors have been developed having component parts readily assembled in the field for making reliable splice connections between power cables.

It is an object of the present invention to provide an improved splice connector of the type having component parts readily assembled in the field, the improvement enabling operation of the completed splice connection at high voltages than heretofore attainable with present splice connectors of that type.

Another object of the invention is to provide a splice connector of the type described and enabling the ready fabrication of a splice connection between high voltage power cables, the splice connection having a degree of electrical as well as structural integrity approaching that of the cables themselves.

Still another object of the invention is to provide a splice connector of the type described which will establish a splice connection of greater mechanical strength and rigidity, as well as a capacity for handling higher voltages.

A further object of the invention is to provide a splice connector of the type described which includes means for assuring that the component parts of the connector are positively located in proper position relative to one another during assembly in the field, as well as during subsequent operation of the splice connection.

A still further object of the invention is to provide a splice connector of the type described in which the portions of the conductors of the connected cables which are bared for connection to one another sealed off from the interface between the outer housing and the remaining component parts of the connection.

Another object of the invention is to provide a splice connector of the type described which is relatively simple and inexpensive to manufacture.

The above objects, as well as still further objects and advantages, are attained by the invention, which may be described briefly as providing in a splice connector for connecting high voltage cables, each cable having a conductor, insulation surrounding the conductor and a shield around the insulation, the connector including a pair of adaptor sleeves for placement of one sleeve at the terminus of each cable, means for connecting bared portions of the conductors together and a housing for placement over the adaptor sleeves and connecting means to engage the adaptor sleeves along an interface between each sleeve and the housing and to enclose the connection between the bared portions of the conductors, the improvement comprising a heat transfer jacket for placement over the connection between the bared portions of the conductors and having a longitudinal length sufficient to extend longitudinally between the adaptor sleeves and a thickness sufficient to extend radially between the connection and the housing, the jacket being constructed of a material of relatively high termal conductivety, and complementary means on the heat transfer jacket and the adaptor sleeves for engaging the jacket with each adaptor sleeve to positively locate and preclude movement of the adaptor sleeves longitudinally relative to one another.

The invention will be more fully understood, while still further objects and advantages thereof will be made apparent, in the following detailed description of an embodiment of the invention illustrated in the accompanying drawing, in which.

Figure 1:
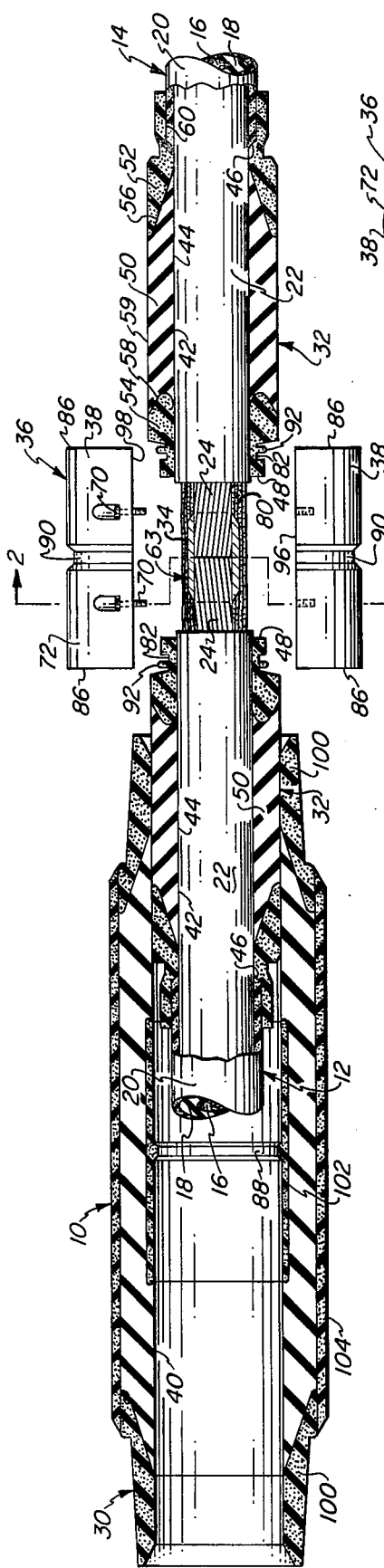
FIG. 1 is a longitudinal, cross-sectional view, partially exploded, of a splice connector being assembled to establish a splice connection between high voltage power cables, all in accordance with the invention.

Referring now to the drawing, and especially to FIG. 1 thereof, the component part of a splice connector are illustrated generally at 10 and are shown being assembled to establish a splice connection between a pair of high voltage cables 12 and 14, all in accordance with the present invention. Cables 12 and 14 each have a central conductor 16 surrounded by insulation 18 which, in turn, is srrounded by a conductive shield 20. A portion of the shield 20 has been removed adjacent the terminal end of each cable to expose a length of insulation at 22 and a portion of the insulation 18 has been removed at the terminus of each cable to expose a terminal portion 24 of each conductor 16.

The component parts of the splice connector 10 include an outer housing 30, a pair of adaptor sleeves 32, an electrical contact element in the form of a metallic 34 and a heat transfer jacket 36 which is shown split into two discrete parts 38. After preparation of the terminal ends of the cables 12 and 14 to expose lengths 22 of insulation and to bare portion 24 of each conductor, the component parts of the splice connector are assembled as follows.

Housing 30, which has an internal bore 40 having a diameter greater than the outer diameter of eithe cable 12 or 14, is slipped over the end of either one of the cables (in this instance cable 12) and is moved along the cable to be temporarily located away from the end of the cable in the direction along the cable. Such movement will meet with little resistance since bore 40 has a larger diameter than the cable. An adaptor sleeve 32 is then installed on each cable. Each adaptor sleeve 32 is constructed of elastomeric materials and includes a central bore 42 which includes an inner surface 44. The relative dimensions of the diameter of inner surface 44 and the diameter of length 22 of insulation 18 are such that bore 42 will be dilated, when adaptor sleeve 32 is placed upon the cable and positioned as illustrated, and will grip the insulation with a fit tight enough to provide sufficient dielectric strength in the creep path along the outer surface of length 22 of insulation 18 between the termination 46 of the shield and the end 48 of the sleeve to assure that current will not pass between conductor 16 and shield 20 along insulation 18.

Each adaptor sleeve 32 includes a first portion 50 of insulating elastomeric material, a second portion 52 of electrically conductive elastomeric material, and a third portion 54 of electrically conductive elastomeric material. Preferably, all of the portions are joined by being molded together so that the junctures 56 and 58 between the portions are continuous and void-free. All of the portions 50, 52 and 54 have a common outer surface 59. Conductive portion 52 has a bore portion 60 which engages shield 20 and makes an electrical connection therewith.

Figure 2:
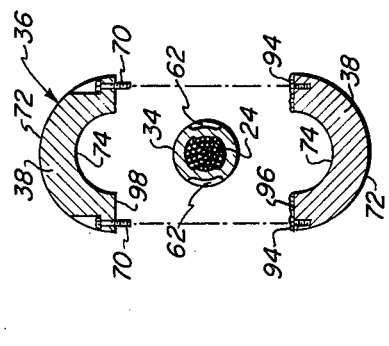
FIG. 2 is a cross-sectional view taken along line 2—2 of FIG. 1.

Once the adaptor sleeves 32 are in place, the terminal portions 24 of the conductors 16 are permanently connected. One method of connection is by inserting bared conductor portions 24 into ferrule 34 and permanently affixing the ferrule to each conductor, as by crimping the ferrule 34 at 62 (see FIG. 2), to establish a connection at 63. Another method is to weld the conductor portions 24 together directly. Other connection methods are known to those skilled in the art.

Figure 3:
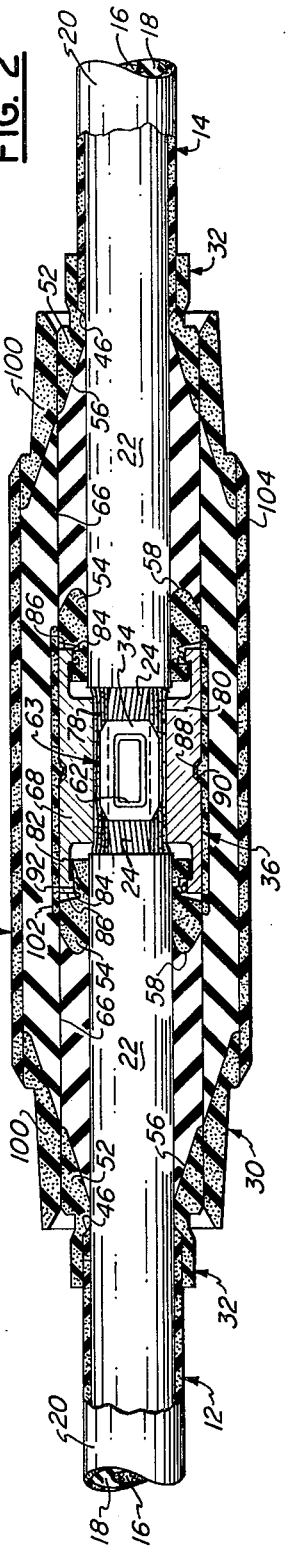
FIG. 3 is a longitudinal cross-sectional veiw of the completed splice connection.

Assembly of the splice connector will be completed to establish the splice connection 64 illustrated in FIG. 3 by pulling the housing 30 over the adaptor sleeves 32, thus enclosing the bared, connected terminal portions 24 of conductors 16. The relative dimensions of the bore 40 of the housing and outer surfaces 59 of the adaptor sleeves 32 are such that the bore 40 will be dilated and sufficient gripping forces will be established between the housing and the adaptor sleeves along interfaces 66 to effect the appropriate seals while imparting the necessary dielectric strength to the creep path along each interface 66 between the conductive portions 52 and 54 of each adaptor sleeve 32.

As best seen in FIG. 3, the lateral spacing of the surface of bore 40 from the connected terminal portions 24 of the conductors 16 in the completed splice connection 64 leaves a considerable gap 68 between the housing and the conductors in the vicinity of the permanent connection 63 between the bared portions of the conductors. During operation of the splice connection, heat generated in the conductors must be dissipated by being conducted through the housing to the ambient areas, just as heat is connected from the cable conductor through the cable insulation and shielding for effective operation of the cables. At higher voltages the amount or thickness of the insulation employed in the splice connection must be increased, thereby reducing the ability to dissipate heat from the connected conductor portions. To enable appropriate amounts of power to be carried at their higher voltages, it is desirable to provide means for more effectively dissipating heat generated in the splice connection. In order to increase the ability to dissipate heat from the connection 63 through the housing 30, heat transfer jacket 36 is placed over the connected terminal portions 24 and ferrule 34 prior to pulling the housing 30 over the sleeves 32 to close the splice connection. Heat transfer jacket 36 is constructed of a material having high thermal conductivity, and is shown fabricated of aluminum, so as essentially to fill the gap 68 and enable more effective dissipation of heat. Installation of the heat transfer jacket 36 is facilitated by constructing the jacket in two discrete parts 38 which can be placed over the connection 63 and then joined together, as by screws 70.

Heat transfer jacket 36, when assembled, is essentially tubular and includes a wall of solid, heat conductive material having a lateral width, or thickness, extending radially between an outer generally cylindrical surface 72 and an inner surface 74. The diameter of the outer surface 72 is essentially the same as that of outer surfaces 59 of adaptor sleeves 32 so that outer surface 72 will engage the surface of bore 40 of housing 30. The diameter of inner surface 74 is small enough to bring jacket 36 as close to connection 63 as is practical, but is made large enough to accommodate dimensional variations in the overall diameter of the connection 63 between the bared, terminal portions 24 of conductors 16 at ferrule 34. Because of the need to accommodate such dimensional variations, a smaller gap 78 is found between inner surface 74 and the connection 63. Gap 78 is also filled with a material having a relatively high thermal conductivity by wrapping the connection 63 with a tape 80 of high thermal conductivity prior to placing the parts 38 of heat transfer jacket 36 over the connection. Thus, heat is dissipated effectively by transfer from the terminal portions 24 of conductors 16 and ferrule 34 through tape 80 and heat transfer jacket 36 to the housing. Such effectuve heat transfer enables operation of the splice connection at appropriate levels of power, but at higher voltages than heretofore available, i.e., above 46 kV, in splice connections of the type which are assembled easily in the field from component parts manufactured in the factory.

Figure 4:
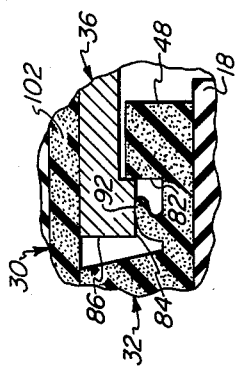
FIG. 4 is an enlarged fragmentary view of a portion of FIG. 3.

In addition to reducing the resistance to heat transfer over a significant portion of the diameter of the splice connection, the heat transfer jacket 36 accomplishes further important objectives. Thus, heat transfer jacket 36 includes means for accurately locating the component parts of the splice connection relative to one another during assembly and for maintaining the desired relative location during service. Each adaptor sleeve 32 includes a circumferential groove 82 adjacent end 48 of the sleeve. Each discrete part 38 of the heat transfer jacket 36 has a circumferentially extending rib 84 projecting inwardly at each end 86 of the jacket part. Heat transfer jacket 36 has a longitudinal length long enough such that upon assembly of the parts 38 of the heat transfer jacket 36 around the connection 63, and with the adaptor sleeves 32 in the proper location relative to one another, each rib 84 will enter a corresponding groove 82, as seen in FIGS. 3 and 4, to assure that the sleeves 32 are in the proper location and to secure the sleeves 32, as well as the jacket 36, in the desired positions relative to one another. In this manner, longitudinal movement of adaptor sleeves 32 relative to one another is precluded. Upon subsequent placement of the housing 30 over the adaptor sleeve 32 and over jacket 36, a projection in the housing, shown in the form of circumferential rib 88 projecting inwardly from the surface of bore 40, wll be seated in a corresponding groove 90 extending circumferentially around the heat transfer jacket, thereby locating and securing the housing 30 in proper position relative to adaptor sleeves 32.

Because of the ridigity of the assembled heat transfer jacket 36, and the manner in which jacket 36 engages the adaptor sleeves 32 and bridges and essentially fills the space between the confronting ends 48 of the sleeves 32, the assembled splice connection is reinforced and provided with a high degree of structural strength and rigidity. The combined effects of the structural strength and the heat transfer capabilities imparted by the heat transfer jacket 36 aid in bringing the structural intergrity and power handling capabilities of the splice connection up to the level of performance of the cables themselves.

In order to further preserve the integrity of the splice connection 64, the bared conductor portions 24 are sealed-off from the interfaces 66 so that any moisture or other deleterious substances which may emerge from the interior of the cables as a result of baring the conductors at the connection 63 will be isolated from interfaces 66. Thus, a circumferential lip 92 projects outwardly in each groove 82 and each lip 92 is engaged by a rib 84, as best seen in FIG. 4, to establish an effective seal adjacent the end 48 of each adaptor sleeve 32. The seals which are thus established will confine, within the assembled heat transfer jacket 36, any moisture or other deleterious material which may appear at conductor portions 24. Additionally, a sealant 94 (see FIG. 2) may be applied between the mating surface 96 and 98 of the parts 38 of jacket 36 to assure that the interior of the jacket 36 is sealed upon assembly of the parts 38.

Referring now to FIG. 3, electrical stresses within the splice connection 64 are appropriately graded by providing the housing 30 with electrically conductive portions 100 at the ends thereof and a sleeve-like portion 102 of electrically conductive material contiguous with bore 40 intermediate the ends of the housing. Portions 100 and 102 are constructed of an electrically conductive elestomer. Portions 100 are electrically connected with corresponding portions 52 of adaptor sleeves 32 so as to enable a smooth transition in the pattern of electrical stresses extending from the termination 46 of each shield 20 along the splice connection from one end thereof toward the opposite end. An outer portion 104 of electrically conductive material provides a continuous shielding system across the splice connection between the shields 20 of the cables. Portion 102 is electrically connected to portions 54 of the adaptor sleeves 32 and to the connection 63 so as to place the interior portion of the splice connection which lies within portion 102 within an envelope of essentially equal electrical potential and thereby eliminate deleterious stressing of voids within the splice connection, while providing the apropriate grading of the electrical stress pattern between the confronting ends 48 of the adaptor sleeves 32.

It is to be understood that the above detailed description of an embodiment of the invention is provided by way of example only. Various details of design and construction may be modified without department from the true spirit and scope of the invention, as set forth in the appended claims.

The embodiments of the invention in which an exclusive property or privilege is claimed are defined as follows:

1. In a splice connector for connecting high voltage cables, each cable having a conductor, insulation surrounding the conductor and a shield around the insulation, the connector including a pair of adaptor sleeves for placement of one sleeve at the terminus of each cable, means for connecting bared portions of the conductors together and a housing for placement over the adaptor sleeves and connecting means to engage the adaptor sleeves along an interface between each sleeve and the housing and to enclose the connection between the bared portions of the conductors, the improvement comprising:

a heat transfer jacket for placement over the connection between the bared portions of the conductors and having a longitudinal length sufficient to extend longitudinally between the adaptor sleeves, and a thickness sufficient to extend radially between the connection and the housing, said jacket being constructed of a material of relatively high thermal conductivity; and complementary means on the heat transfer jacket and the adaptor sleeves for engaging the jacket with each adaptor sleeve to positively locate and preclude movement of the adaptor sleeves longitudinally to one another.

2. The invention of claim 1 wherein the heat transfer jacket and the housing include complementary means for engaging the housing with the jacket to positively locate the housing relative to the heat transfer jacket.

3. The invention of claim 2 wherein the complementary means on the heat transfer jacket and the housing includes a groove extending circumferentially around the outer surface of the jacket intermediate the ends thereof and an inwardly extending projection intermediate the end of the housing for engaging the groove in the jacket to positively locate the housing relative to the jacket.

4. The invention of claim 1 wherein the heat transfer jacket and each adaptor sleeve include complementary sealing means such that upon engagement of the jacket with the adaptor sleeves, the connection between the bared portions of the conductors will be sealed within the jacket and therby isolated from the interface between each adaptor sleeve and the housing.

5. The invention of claim 1 wherein the heat transfer jacket comprises a generally rigid, tubular, longitudinally extending member which is split longitudinally for placement over confronting end portions of the adaptor sleeves and the connection between the bared portions of the conductors.

6. The invention of claim 5 wherein the heat transfer jacket is split longitudinally into at least two discrete parts capable of being assembled about the confronting end portions of the adaptor sleeves and the connection.

7. The invention of claim 6 wherein each discrete part has a rib extending laterally inwardly and the confronting end of each adaptor sleeve includes a complementary groove for receiving a corresponding rib to positively locate the adaptor sleeves relative to one another.

8. The invention of claim 7 wherein each rib is continuous, circumferential rib and each groove is a continous, circumferential groove, and including a circumferential elastomeric lip in each groove, each said lip being in position to be engaged by a rib in the heat transfer jacket to seal the connection within the heat transfer jacket and thereby isolate the connection and the bared portions of the conductors from the interface between each adaptor sleeve and the housing.

9. The invention of claim 8 including complementary means on the heat transfer jacket and the housing for engaging the housing with the jacket to positively locate the housing relative to the jacket.

10. The invention of claim 9 wherein the complementary means on the heat transfer jacket and the housing includes a groove extending circumferentially around the outer surface of the jacket intermediate the ends thereof and an inwardly extending projection intermediate the ends of the housing for engaging the groove in the jacket to positively locate the housing relative to the jacket.

11. In a splice connection connecting high voltage cables, each cable having a conductor, insulation surrounding the conductor and a shield around the insulation, the connection including a pair of adaptor sleeves, one sleeve placed at the terminus of each cable, means connecting bared portions of the conductors together, and a housing placed over the adaptor sleeves and connecting means and engaging the adaptor sleeves along an interface between each sleeve and the housing so as to enclose the connection between the bared portions of the conductors, the improvement comprising:

a heat transfer jacket placed over the connection between the bared portions of the conductors and having a length extending longitudinally between the adaptor sleeves and a thickness extending radially between the connection and the housing, said jacket being constructed of a material of relatively high thermal conductivity, and complementary means on the heat transfer jacket and the adaptor sleeves, said means engaging the jacket with each adaptor sleeve to positively locate and preclude movement of the adaptor sleeves longitudinally relative to one another.

12. The invention of claim 11 wherein the heat transfer jacket and the housing include complementary means, said means engaging the housing with the jacket to positively locate the housing relative to the heat transfer jacket.

13. The invention of claim 12 wherein the complementary means on the heat transfer jacket and the housing includes a groove extending circumferentially around the outer surface of the jacket intermediate the ends thereof and an inwardly extending projection intermediate the ends of the housing engaging the groove in the jacket to positively locate the housing relative to the jacket.

14. The invention of claim 11 wherein the heat transfer jacket and each adaptor sleeve include complementary sealing means such that the connection between the bared portions of the conductors is sealed within the jacket and thereby isolated from the interface between each adaptor sleeve and the housing.

15. The invention of claim 11 wherein the heat transfer jacket comprises a generally rigid, tubular, longitudinally extending member which is split longitudinally.

16. The invention of claim 15 wherein the heat transfer jacket is split longitudinally into at least two discrete parts which are assembled about the confronting end portions of the adaptor sleeves and the connection.

17. The invention of claim 16 wherein each discrete part has a rib extending laterally inwardly and the confronting end of each adaptor sleeve includes complementary groove receiving a corresponding rib to positively locate the adaptor sleeves relative to one another.

18. The invention of claim 17 wherein each rib is a continuous, circumferential rib and each groove is a continuous, circumferential groove, and including a circumferential elastomeric lip in each groove, each said lip being engaged by a rib in the heat transfer jacket to seal the connection within the heat transfer jacket and thereby isolate the connection and the bared portions of the conductors from the interface between each adaptor sleeve and the housing.

19. The invention of claim 18 including complementary means on the heat transfer jacket and the housing, said means engaging the housing with the jacket to positively locate the housing relative to the jacket.

20. The invention of claim 19 wherein the complementary means on the heat transfer jacket and the housing includes a groove extending circumferentially around the outer surface of the jacket intermediate the end thereof and an inwardly extending projection intermediate the ends of the housing engaging the groove in the jacket to positively locate the housing relative to the jacket.

* * * * *